United States Patent [19]

Griffin

[11] Patent Number: 5,153,816
[45] Date of Patent: Oct. 6, 1992

[54] FACE PLATE WITH DECORATOR INSERT

[75] Inventor: Raymond T. Griffin, Plano, Tex.

[73] Assignee: Lightolier Incorporated, Secaucus, N.J.

[21] Appl. No.: 691,468

[22] Filed: Apr. 25, 1991

[51] Int. Cl.⁵ .............................................. H05K 7/00
[52] U.S. Cl. .................................... 361/393; 361/413;
361/427; 361/429; 200/46; 174/65; 174/66
[58] Field of Search ................ 361/380, 393, 413, 420,
361/427, 428, 429; 200/43.01, 43.04, 46, 309;
174/65, 66, 67, 221; 220/241, 242

[56] References Cited

U.S. PATENT DOCUMENTS

| | | | |
|---|---|---|---|
| 2,289,198 | 7/1942 | Jordan | 220/24.2 |
| 2,515,820 | 7/1950 | Clark | 40/134 |
| 2,980,283 | 4/1961 | Bentsen | 220/24.2 |
| 4,009,797 | 3/1977 | Lee | 220/241 |
| 4,312,458 | 1/1982 | Stewart | 220/241 |
| 4,500,746 | 2/1985 | Meehan | 174/48 |
| 4,733,330 | 3/1988 | Tanaka et al. | 361/356 |
| 4,780,573 | 10/1988 | Own | 174/66 |
| 4,800,239 | 1/1989 | Hill | 174/66 |
| 4,833,277 | 5/1989 | Jacoby et al. | 174/66 |
| 4,835,343 | 5/1989 | Graef et al. | 174/66 |
| 5,041,698 | 8/1991 | Takagi et al. | 174/66 |

Primary Examiner—Leo P. Picard
Assistant Examiner—Young S. Whang
Attorney, Agent, or Firm—Dennis T. Griggs

[57] ABSTRACT

A face plate assembly has a removable decorator insert card which is retained within a face plate housing without screw fasteners. The face plate housing has an elongated slot which opens into a device cavity in which a touch switch is mounted. The decorator insert card is adapted for slidable insertion into and withdrawal out of the device cavity through the housing slot. The face plate assembly is releasably attached to the yoke strap of a wiring device mounted in a wall box by press-fit connectors. In one embodiment, the decorator insert card can be installed and replaced by releasing the face plate housing from the press-fit connector, and inserting or withdrawing the decorator insert card through a hidden housing slot formed in a back plate portion of the housing. In an alternative embodiment, the decorator insert can be installed and replaced without requiring removal of the face plate assembly by inserting or withdrawing the decorator insert card through a housing slot which intersects a web along the top edge of the face plate housing.

32 Claims, 4 Drawing Sheets

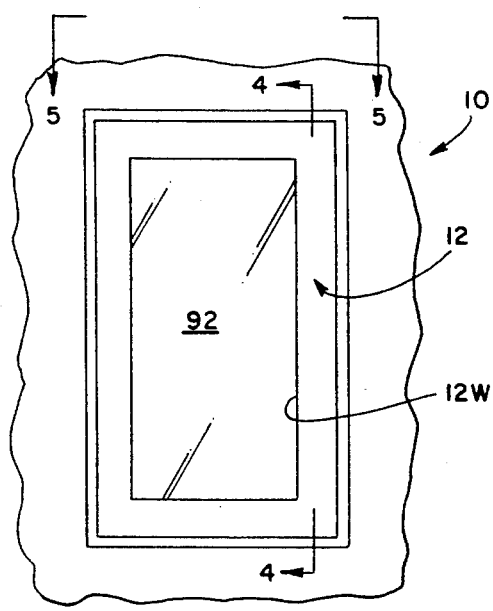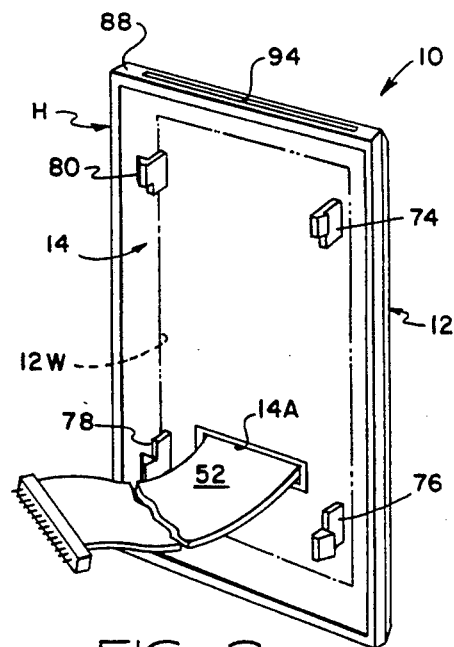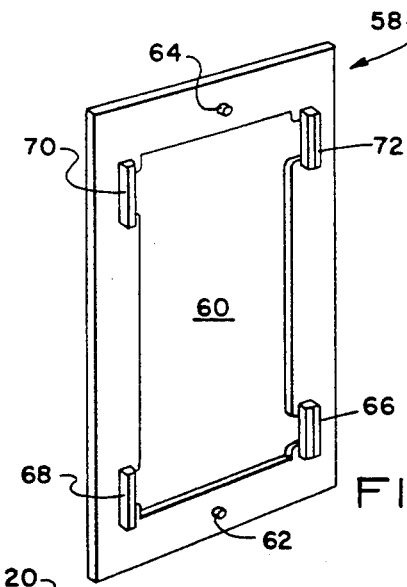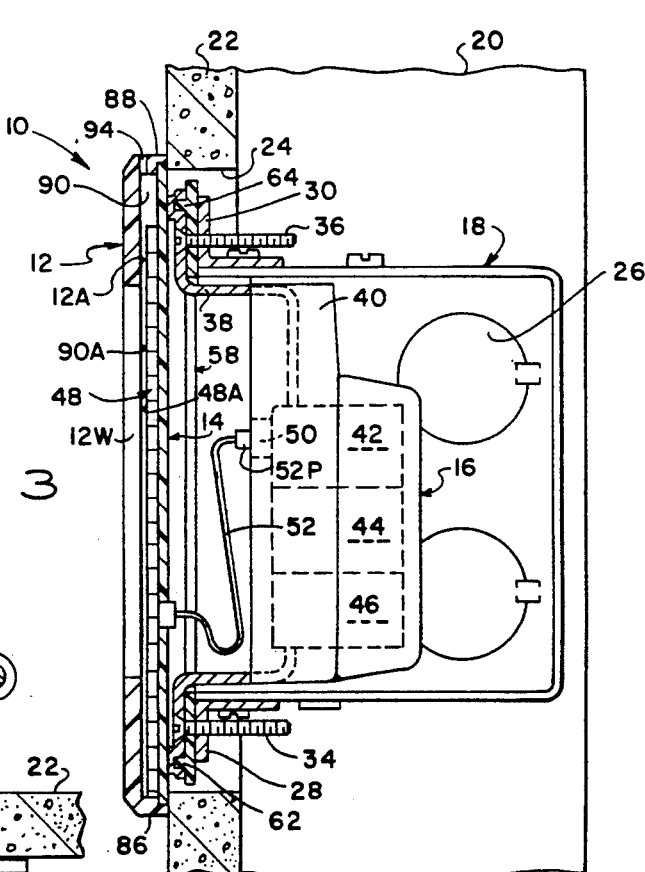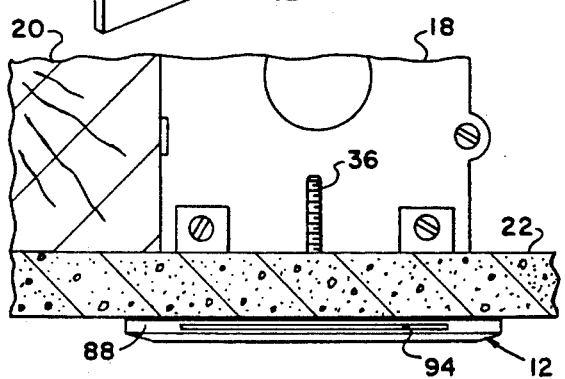
FIG. 1
FIG. 2
FIG. 3
FIG. 4
FIG. 5

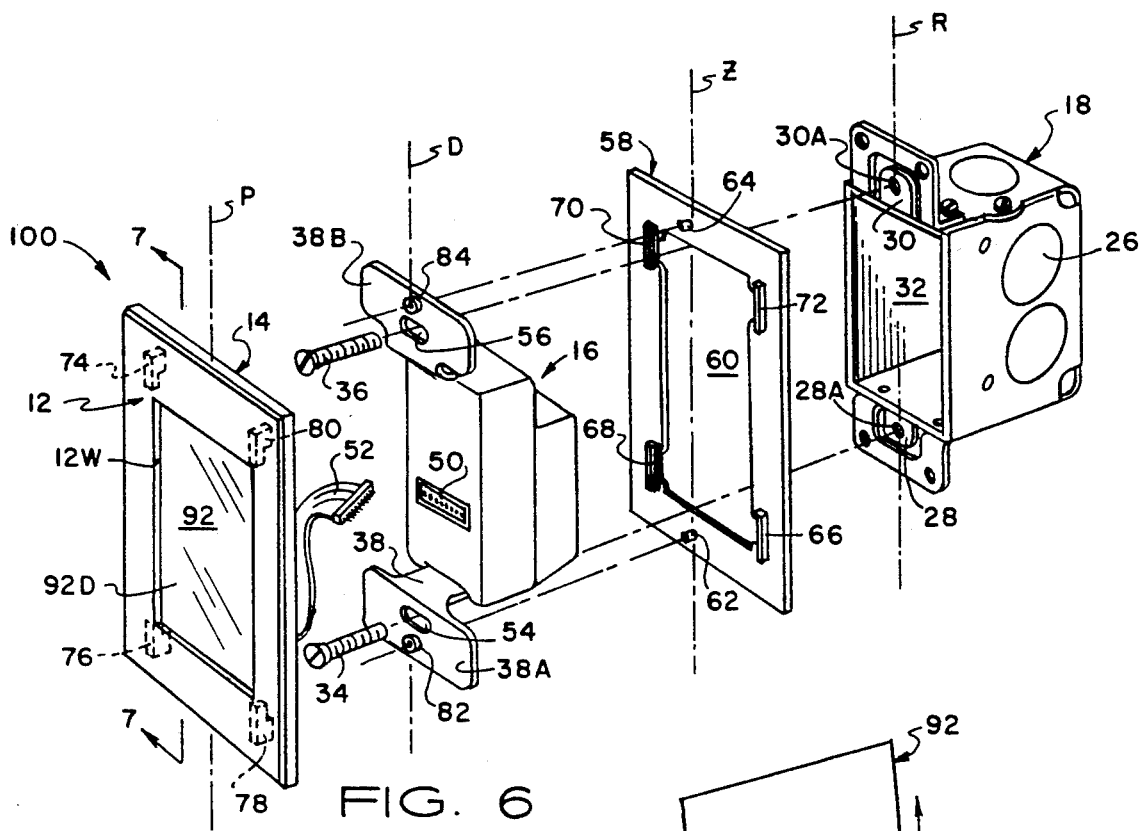
FIG. 6
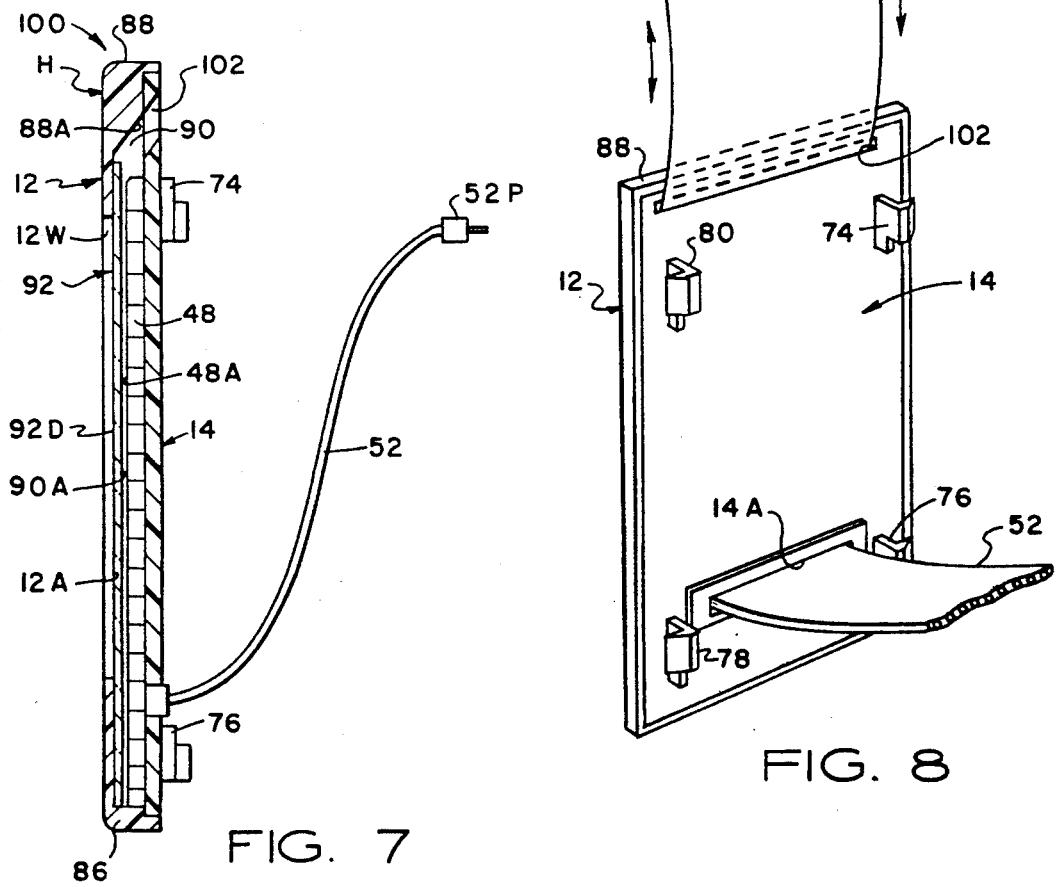
FIG. 7
FIG. 8

FACE PLATE WITH DECORATOR INSERT

FIELD OF THE INVENTION

This invention relates generally to wall-mountable wiring device accessories, and in particular to a face plate having a replaceable decorator insert.

BACKGROUND OF THE INVENTION

Conventional wall box cover plates, referred to herein as face plates, are usually in the form of a flat plate having one or more openings providing access to a wiring device within a wall box. The purpose of the face plate is to provide a decorative cover for the wall box installation while preventing operator exposure to the interior of the wall box which contains electrical wiring. As used herein, "wiring device" refers generally to electrical power control/distribution devices, including but not limited to ON/OFF switches, membrane switches, touch pad switches, light dimmer controls, motor speed controls, power outlets and the like, and to certain communications/data connectors such as telephone jacks, coaxial cable connectors, TV antenna connectors, and computer network cable connectors.

Wiring devices conforming to NEMA standards include a metal yoke or mounting strap with oversized mounting holes which permit horizontal position adjustment of the wiring device within a wall box. The yoke strap also includes one or more threaded mounting holes for attaching the face plate by screw fasteners to the yoke strap, thereby completing the enclosure of the device and wiring terminations within the wall box.

The enclosed wiring device may have an externally projecting switch actuator, control knob, toggle arm, power receptacle or the like which is supported on the mounting strap by an insulating escutcheon. The face plate access opening is closely conformed about the escutcheon to expose the projecting device portion while limiting operator access to electrical terminals and wiring within the wall box. Some wiring devices, for example membrane switches and touch pad switches, have pressure responsive actuator surfaces which are flush mounted within the access opening.

DESCRIPTION OF THE PRIOR ART

Presently, there is an interest in customizing decorator face plates to harmonize with room decor such as wallpaper, drapes, furnishings and the like. Some prefer to personalize the face plate by displaying a favorite photographic or fanciful design. For example, in a child's room, it may be desirable to display a cartoon character or the likeness of an entertainer or sports figure on the face plate. Moreover, it may be desirable to display the logo of a favorite sports team or musical group. In business applications, it may be desirable to display a company logo or building safety/security information. It will be appreciated that conventional face plates cannot accommodate such a wide variety of unique display requirements, most of which are personal or subjecting in nature. It will also be appreciated that such personal preferences may change from time-to-time, and that conventional face plate assemblies which utilize screw fasteners make such replacement difficult even when an appropriate decorator face plate can be found.

When screw fasteners are used to mount a conventional face plate onto the yoke strap of a wiring device, surface discontinuities are produced which detract from the aesthetic appearance of the installation. Some decorator face plates are formed of a colored polymeric material, for example white, ivory, black and brown to provide an approximate color match with the wall finish. Other decorative face plates may be covered with a section of wallpaper to provide an exact color and pattern match with decorative wall treatments. Such decorative installations require that the heads of the metal screw fasteners be color matched. The use of metal screw fasteners in combination with such decorative face plates has not always been satisfactory because the paint or plating on the head of the screw fastener tends to flake and wear away, and are subject to discoloration due to rust. The decorator face plate itself is subject to marking and smudging due to repeated finger contact.

OBJECTS OF THE INVENTION

The principal object of the present invention is to provide a face plate assembly having a removable decorator insert card which is retained without screw fasteners, and which can be easily removed and replaced without tools.

A related object of the present invention is to provide a decorator face plate assembly which is adapted for retrofit installation on a NEMA standard wall box in which an existing face plate and screw fasteners are removed and discarded, with the decorator face plate assembly of the present invention being substituted in its place.

A general object of the present invention is to provide an improved decorator face plate assembly for an electrical wiring device, which covers the electrical wiring device and provides a clean, unbroken decorative appearance.

Another object of this invention is to provide an improved face plate assembly of the character described, in which a decorator insert can be installed and replaced without requiring removal of the face plate.

Still another object of the present invention is to provide a decorator face plate cover assembly for a touch switch of the type having a membrane switch actuator and a control module mounted on a yoke strap, in which the yoke strap is secured by screw fasteners in the usual way, but in which the membrane switch actuator is covered by a removable decorator insert card which does not utilize screw fasteners, in which the entire touch switch, screw fasteners and wall box are hidden from view by the external face plate and decorator insert card.

Another object of the present invention is to provide an improved decorator face plate assembly for use in combination with a wiring device of the type which is secured by screw fasteners to a wall box, in which the face plate decorator element can be installed and removed without removing the wiring device from the wall box.

Still another object of the present invention is to provide an improved decorator face plate assembly of the character described, which is adapted for use in combination with touch responsive switch devices.

SUMMARY OF THE INVENTION

The foregoing objects are achieved according to the present invention by a face plate assembly having a removable decorator insert card which is retained without screw fasteners, and which can be easily removed and replaced without tools. The face plate assembly is adapted for use in combination with a wiring device of the type having a yoke strap for attachment to a wall box, a control module mounted on the yoke strap, and a pressure responsive actuator. The face plate assembly includes a face plate having a window opening providing finger touch access to the pressure responsive actuator.

The face plate and back plate together define a housing which encloses the pressure responsive actuator and a removable display card. The housing is intersected by an elongated slot which opens into the device cavity. The display card is interposed between the face plate and the pressure responsive actuator. According to this arrangement, the switch can be actuated by finger pressure applied against the display card. The display card may be inserted into and withdrawn from the device cavity through the housing slot. In the preferred embodiment, the display housing is coupled to the wiring device by releasable, press-fit connectors. According to this arrangement, the display insert card may be inserted into and withdrawn from the device cavity through the housing slot without the use of tools, and without removing the wiring device from the wall box.

The display insert card masks the touch switch actuator so that the entire touch switch, wiring device and wall box are hidden from view by the external face plate and decorator insert card, without interfering with normal operation of the touch switch.

The novel features of the invention are set forth with particularity in the claims. The invention will be best understood from the following description when read in conjunction with the accompanying drawings, wherein:

BRIEF DESCRIPTION OF THE DRAWINGS

FIG. 1 is an elevation view of a touch switch installation wherein the touch switch, yoke strap, control module and wall box are covered by a screwless face plate and decorator insert card according to the present invention;

FIG. 2 is a rear perspective view of the face plate assembly shown in FIG. 1;

FIG. 3 is a front perspective view of a coupling plate which is used in combination with the face plate assembly shown in FIG. 2;

FIG. 4 is a sectional view of the touch switch installation, including the control module and wall box shown in FIG. 1, taken along the lines 4—4;

FIG. 5 is a top plan view, partially in section, of the switch installation of FIG. 1 taken along the lines 5—5;

FIG. 6 is an exploded perspective view of the touch switch assembly shown in FIG. 1;

FIG. 7 is a sectional view of an alternative display housing embodiment taken along the lines 7—7 of FIG. 6;

FIG. 8 is a rear perspective view of the display housing assembly shown in FIG. 7 which illustrates the insertion of a display insert card through a rear housing slot;

DETAILED DESCRIPTION OF THE PREFERRED EMBODIMENTS

Figure 9:
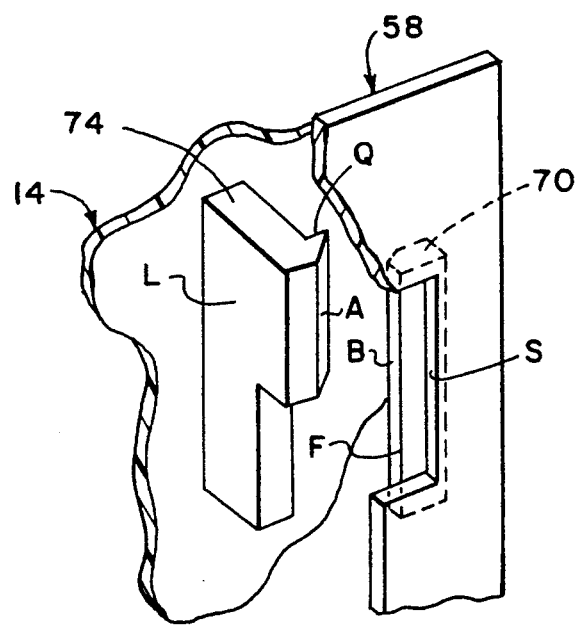
FIG. 9 is a perspective view, partially broken away, which illustrates the press-fit connectors carried by the back plate and the coupling plate shown in FIG. 2 and FIG. 3.

In the description which follows, like parts are marked throughout the specification and drawings with the same reference numerals, respectively. The drawings are not necessarily to scale and the proportions of certain parts have been exaggerated to better illustrate features of the invention.

Referring now to FIGS. 1-6, the face plate assembly 10 according to one embodiment of the present invention includes a face plate 12 and a back plate 14 which are adapted for use in combination with a wiring device, for example a dimmer control module 16, which is installed within a conventional wall box 18. The wall box 18 is nailed against an upright 2×4 wall stud 20, with the face of the wall box being substantially flush mounted on a wall 22 within a rectangular cutout opening 24. The wall box 18 provides a stable, protective enclosure in which the control module 16 or other wiring device can be safely mounted. Knock-out tabs 26 are formed in the sidewalls of the wall box 18 through which electrical power distribution conductors are routed for interconnection with power terminals or wiring leads which form a part of the control module 16.

The wall box 18 includes mounting flanges 28, 30 in which threaded mounting holes 28A, 30A are formed, respectively. The mounting holes 28A, 30A in the mounting flanges 28, 30 are standard 6-32 threaded mounting holes. The threaded mounting holes 28A, 30A are spaced along standard $3\frac{1}{4}$ inch centers in alignment with the longitudinal axis R of the wall box 18. The wall box cavity 32 has a standard rectangular opening of about $1\frac{3}{4}$ inches wide by about $2\frac{7}{8}$ inches high. The control module 16 is attached to the mounting flanges 28, 30 of the wall box 18 by a pair of threaded screw fasteners 34, 36.

The control module 16 is mounted on a metal yoke strap 38 and is insulated with respect thereto by an insulating body 40. The control module 16 includes a D.C. power supply 44, a microprocessor controller 42, and a gate controlled power switch 46, all being encapsulated within the insulation body 40. The controller is electrically coupled to a touch switch 48 through a pin connector receptacle 50 and a wiring harness 52.

The yoke strap 38 has mounting flanges 38A, 38B which project below and above the wall box opening 32. A pair of slot openings 54, 56 are formed on the mounting flanges 38A, 38B, respectively, in alignment with the longitudinal axis D of the module 16. The slot openings 44, 46 are elongated laterally and are sized to permit unrestricted passage of the screw fasteners 34, 36. According to this arrangement, the control module 16 is mountable on the wall box 18, and the horizontal position of the control module relative to the wall box 18 is adjustable so that the pin connector receptacle 50 can be centered within the wall cutout opening 24. The center-to-center spacing of the slot openings 54, 56 is the same as the center-to-center spacing of the threaded screw holes 28A, 30A.

The face plate assembly 10 is releasably attached to the yoke strap 38 by a coupling plate 58. The coupling plate 58 has a rectangular opening 60 through which the control module wiring harness 52 are extended in coupling engagement with the mounting flanges 28, 30 of the wall box 18. Index pins 62, 64 are mounted on the coupling plate 58 in alignment with the central longitudinal axis Z of the coupling plate 58. Also formed on the coupling plate 58 are press-fit connectors 66, 68, 70 and 72. The press-fit connectors 66, 68, 70 and 72 each have an interlock pocket in the form of an elongated slot S which is partially closed by a retainer flange F, as shown in FIG. 9.

Referring now to FIG. 9, the slot S in each connector pocket is adapted for interlocking engagement with complementary press-fit connector studs 74, 76, 78 and 80, respectively, which are mounted on the external surface of the back plate 14. Each connector stud has a latch post L which is adapted for insertion into the connector pocket S. The connector studs 74, 76, 78 and 80 and the latch post L are adapted to deflect and produce an interference engagement upon insertion of the latch post L into the pocket S. To facilitate insertion of the latch post L, the latch post L has a beveled face A and the retainer flange F has a complementary beveled face B.

As the latch post L is inserted into the slot S, the beveled faces A, B slip relative to each other. At the same time, the latch post L deflects laterally outwardly, and the retainer flange F deflects inwardly to permit the latch post L to be fully inserted into the pocket S. The latch post L has a transverse shoulder Q which retracts into engagement with the underside of the retainer flange F, thereby retaining the latch post L as the latch post L is fully inserted and the beveled face A clears the beveled face B, securely within the pocket S.

The face plate 10 has a rectangular opening 56 through which the wiring harness 52 is extended. The press-fit connector studs 74, 76, 78 and 80 are positioned symmetrically with respect to the longitudinal axis P of the face plate assembly 10 and are aligned for interlocking press-fit engagement within the elongated slots S of the press-fit connectors 66, 68, 70 and 72 which are mounted on the coupling plate 58.

When the coupling plate 58 is assembled on the yoke strap 38 as shown in FIG. 4, it provides press-fit attachment of the face plate assembly 10 without using screw fasteners. The coupling plate 58 provides a stable base and longitudinal alignment for the face plate 10. The stable foundation is achieved by capturing the coupling plate 58 between the mounting strap 38 and the wall box mounting flanges 28, 30. The rectangular opening 42 within the coupling plate 58 is oversized with respect to the control module 16, thereby providing clearance for passage of the screw fasteners 34, 36 for engagement with the threaded mounting holes 28A, 38A of the wall box mounting flanges 28, 30. As the screw fasteners 34, 36 are tightened, the yoke strap mounting flanges 38A, 38B tightly compress the coupling plate 58 against the wall box mounting flanges 28, 30.

Longitudinal alignment of the coupling plate 58 relative to the control module 16 is provided by the index pins 62, 64 which are mounted in registration with threaded mounting holes 82, 84. The mounting holes 82, 84 are formed on standard centers on the yoke strap mounting flanges 38A, 38B and are in alignment with the longitudinal axis D. The threaded mounting holes 82, 84 are sized for threaded engagement with 6-32 screw fasteners for attaching a conventional face plate. In this embodiment, however, the threaded mounting holes 82, 84 are used to receive the index pins 62, 64. This aligns the coupling plate 58 with the control module 16 and insures that the face plate assembly 10 is aligned with the wall box cavity 32 when the face plate assembly 10 is installed in press-fit engagement with the pocket connectors of the coupling plate 58.

Referring again to FIG. 2, FIG. 4 and FIG. 5, the face plate assembly 10 includes a display housing H formed by the assembly of the face plate 12 onto the back plate 14, with the face plate and back plate being spaced apart in parallel relation by a base web segment 86 and a top web segment 88. The face plate, back plate and web segments enclose a switch cavity 90 in which the membrane touch switch 48 is received. The switch cavity 90 is slightly oversized relative to the touch switch 48, thereby defining a narrow passage 90A between the interior sidewall surface 12A and the pressure responsive surface 48A of the touch switch 48. The width of the narrow passage 90A is just large enough to permit a decorator insert card 92 to be slipped between the touch switch 48 and the face plate 12.

To accommodate insertion and removal of a decoration insert card 92 through the passage 90A, the housing H is intersected by an elongated slot 94. In the embodiment shown in FIG. 2, FIG. 4 and FIG. 5, the slot 94 intersects the upper web segment 88, and opens into the device cavity 90. According to this arrangement, the decorator insert card 92 can be loaded into the device cavity 90 and slipped into the narrow display passage 90A simply by inserting it through the elongated housing opening 94 until it touches the lower web segment 86 at the bottom of the display passage 90A.

The face plate 12 has a rectangular window opening 12W for exposing the display surface 92D of the decorator insert card which overlaps the switch actuator surface 48A of the touch switch. The decorator insert card 92 is removed out of the switch cavity 90 simply by applying finger pressure through the face plate opening 12A against the display surface 92D of the decorator insert card 92 while pushing upwardly, thereby removing it from the switch cavity 90 through the elongated housing slot 94. Thus, the decorator insert card 92 can be installed and replaced without requiring removal of the face plate assembly, and without requiring special tools.

Preferably, the touch switch 48 is bonded directly onto the back plate 14, which supports the touch switch 48 and reacts finger pressure forces applied through the insert card against its switch actuator surface 48A. It will be appreciated that the decorator insert card 92 may be constructed of any flexible material such as paper or plastic sheet material, and that any fanciful design, logo, figure or the like can be imprinted as desired on the display surface 92D of the decorator insert card.

Referring now to FIG. 6, FIG. 7 and FIG. 8, an alternative face plate assembly 100 carries press-fit connectors 74, 76, 78 and 80 which are adapted for interlocking engagement with the press-fit studs 66, 68, 70, 72 carried on the coupling plate 58. In this embodiment, the face plate assembly 100 is removable from the wall installation without the use of special tools to expose a hidden housing slot 102 which intersects the back plate 14. When it is desired to install or replace a decorator insert card 92 within the switch cavity 90, the face plate assembly 100 is separated from the coupling plate 58, and the decorator insert card 92 is inserted into or withdrawn out of the switch cavity 90 through the hidden housing slot 102, as illustrated in FIG. 8. This can be performed without removing or disturbing the control module 16. The wiring harness 52 has a length which is sufficient to permit the face plate assembly 100 to be tilted forward to expose the hidden housing slot 102, without disconnecting the wiring harness from the control module 16.

Preferably, in the hidden housing slot embodiment, the web 88 is provided with a sloping surface 88A for guiding the insert card into and out of the switch cavity 90. Other housing slot arrangements may be used to good advantage. For example, the housing slot need not intersect the back plate, but may instead be formed by terminating the back plate 14 along its upper edge to form a slot opening along the entire width of the back plate 14 between its top edge and the web 88.

After the decorator insert card 92 has been installed, the face plate assembly 100 is superimposed onto the coupling plate 58, with pressure being applied to the press-fit connectors to cause them to interlock and engage, thereby securing the face plate assembly 100 to the wall box installation.

Figure 10:
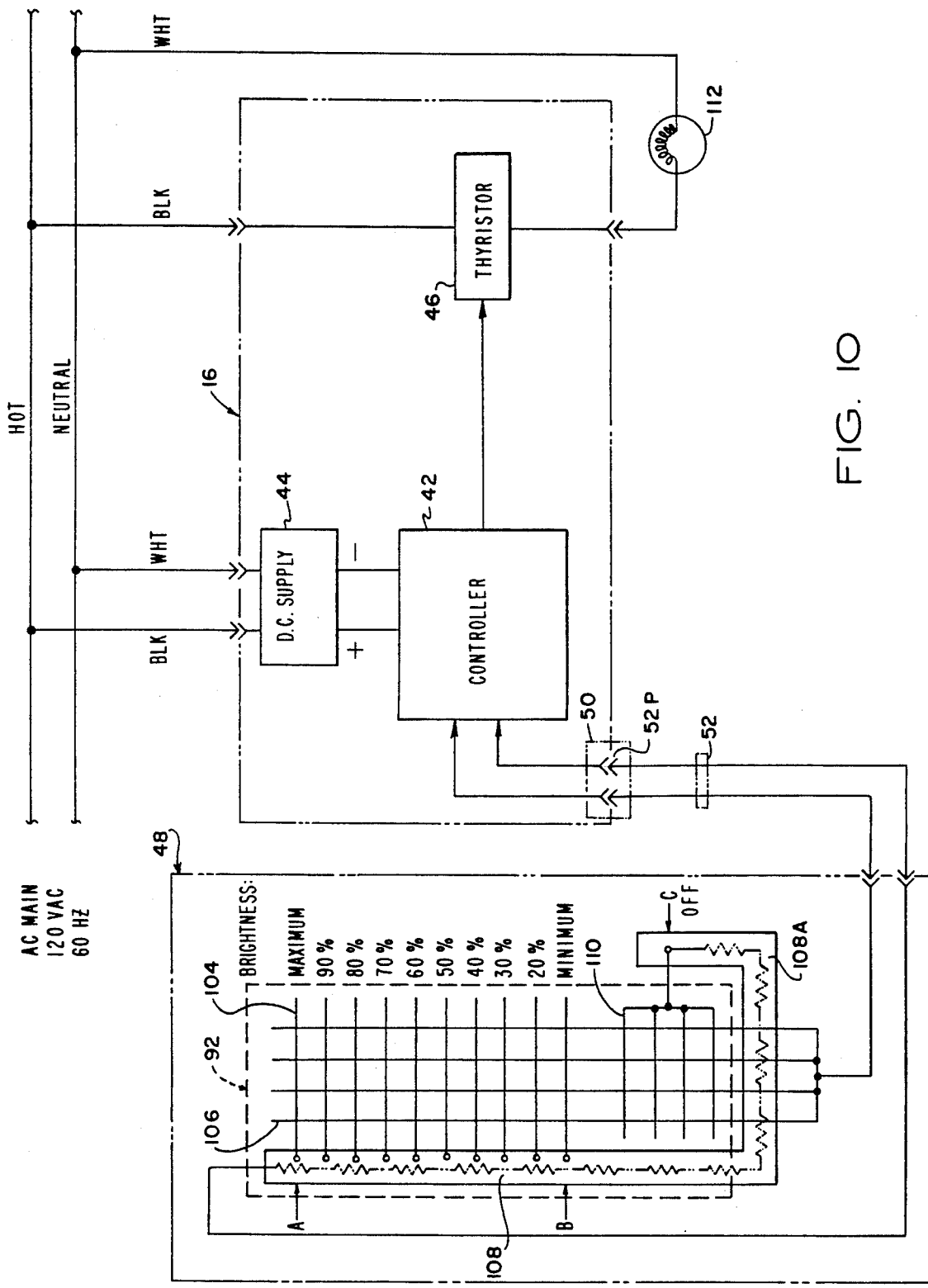
FIG. 10 is a simplified schematic circuit diagram which illustrates the electrical interconnection of the touch switch assembly with a light dimmer control module.

Referring now to FIG. 4 and FIG. 10, the touch switch 48 is physically separated from the control module 16 and is enclosed within the switch cavity 90 of the face plate housing H. The touch switch 48 is electrically connected to the controller 42 by the wiring harness 52. As depicted in FIG. 10, the face plate 92 is superimposed over the pressure responsive surface of the touch switch 48. In this embodiment, the touch switch 48 is a membrane switch having an array of row conductors 104 and column conductors 106. The row conductors and column conductors extend transversely with respect to each other and are spaced apart vertically by spacer elements (not shown), thereby defining a pressure responsive switch at each row and column intersection.

In this analog switch embodiment, the touch switch 48 includes a distributed resistance element 108, with the row conductors 104 being electrically connected to the resistance element at spaced locations. According to this arrangement, each row conductor taps a unique resistance value for input to the controller 42. For example, the distributed resistance values along the upper row conductors 104 from tap point A to tap point B is in the range of 1,000 ohms-100,000 ohms for signaling brightness commands in 10 percent increments from a MINIMUM brightness level to a MAXIMUM brightness level. The lower row conductors 110 are connected at tap point C to an extended section 108A of distributed resistance, which adds another 100,000 ohms to the series resistance circuit. The lower row conductors 110 thus present a total resistance value of 200,000 ohms to the input of the controller 42 for signaling an OFF command.

The controller 42 includes a voltage divider network and an analog-to-digital converter which converts the unique resistance values to digital data words which are input to a microprocessor for controlling the duty cycle of the gate controlled switch 46, which is preferably a thyristor. According to this arrangement, operating power is selectively applied from an AC main supply to a lamp 112, and its brightness is varied merely by pressing the appropriate row/column switch location on the touch switch 48.

It will be appreciated that the foregoing face plate assembly can be utilized to mount a decorator face plate and insert card onto a wiring device wall installation without the use of screw fasteners. The decorative face plate assembly is attached to the yoke strap of a NEMA standard wiring device by a coupling plate which is confined between mounting flanges on the wiring device and mounting flanges on the wall box. The face plate assembly is adapted for retrofit installation, with the press-fit face plate assembly being attachable to the wall box without screw fasteners. Consequently, the body of the wiring device, its retaining screw fasteners, the touch switch and the wall box are hidden from view by the external face plate and decorator insert card. Thus, the decorative face plate assembly conforms with enclosure standards regarding flammability and mechanical strength, without limiting or otherwise interfering with the aesthetic appearance of the installation.

While certain preferred and alternative embodiments of the invention have been set forth for purposes of disclosure, modifications to the disclosed embodiments as well as other embodiments thereof may occur to those skilled in the art. Accordingly, the appended claims are intended to cover all embodiments of the invention and modifications thereof which do not depart from the spirit and scope of the invention.

What is claimed is:

1. A face plate assembly for use in combination with a wiring device of the type having a pressure responsive switch, said face plate assembly comprising:
   a display housing including a face plate and a back plate, said face plate and back plate being assembled together, thereby defining a switch cavity in which said pressure responsive switch is received, and said display housing being intersected by an elongated housing slot which opens into the switch cavity;
   said face plate having a window opening providing finger touch access to the pressure responsive switch disposed within the cavity; and,
   an insert card disposed within the switch cavity and having a display surface exposed by the window opening, said insert card being adapted for slidable insertion into and withdrawal from the switch cavity through the housing slot.

2. A face plate assembly as defined in claim 1, wherein the back plate is intersected by the housing slot.

3. A face plate assembly as defined in claim 1, including a web separating the face plate and back plate, said web being intersected by the housing slot.

4. A face plate assembly as defined in claim 1, wherein said housing slot is formed in the housing intermediate the face plate and the back plate.

5. A face plate assembly as defined in claim 1, including a web separating the face plate and the back plate, said web having a sloping surface for guiding the insert card into and out of the switch cavity.

6. A face plate assembly as defined in claim 1, wherein said back plate includes an interior surface for engaging the pressure responsive switch.

7. A touch switch assembly comprising:
   a display housing including a face plate having a window opening and a back plate mounted on said face plate in spaced relation therewith, thereby defining a device cavity therebetween, said housing being intersected by an elongated housing slot which opens into the device cavity;
   a switch disposed within the device cavity, said switch having a pressure responsive actuator surface aligned with said window opening; and,
   an insert card interposed between the face plate and the switch, said insert card having a display surface exposed by the window opening, and said insert card being adapted for slidable insertion into and withdrawal out of the device cavity through the housing slot.

8. A touch switch assembly as defined in claim 7, wherein said back plate is intersected by the housing slot.

9. A touch switch assembly as defined in claim 7, including a web separating the face plate and the back plate, said web being intersected by the housing slot.

10. A touch switch assembly as defined in claim 7, wherein the elongated slot is formed in the housing intermediate the face plate and the back plate.

11. A touch switch assembly as defined in claim 7, wherein the back plate is intersected by the housing slot, and said housing including a web separating the back plate from the face plate, said web having a sloping surface for guiding the insert card into and out of the device cavity.

12. A touch switch assembly as defined in claim 7, wherein the switch is mounted on the back plate with its pressure responsive actuator surface being separated from said face plate.

13. A touch switch assembly as defined in claim 7, wherein said switch is a membrane switch having row conductors and column conductors extending transversely with respect to each other and spaced apart in overlapping relation, thereby defining an array of pressure responsive switches at the intersection of each row conductor and column conductor.

14. A touch switch assembly as defined in claim 7, wherein said switch is a membrane switch having a distributed resistance element, the row conductors being connected to the resistance element at spaced locations, and the column conductors extending transversely with respect to the row conductors and being spaced apart in overlapping relation, thereby defining an array of switch locations at the row and column intersections.

15. Apparatus for attachment to a wall box comprising:
- a wiring device including a yoke strap for attachment to the wall box and a control module mounted on the yoke strap;
- a display housing including a face plate and a back plate, said face plate and back plate being assembled together thereby defining a device cavity, and said housing being intersected by an elongated slot which opens into the device cavity;
- said face plate having a window opening providing finger touch access to the device cavity;
- a switch disposed within the device cavity, said switch having a switch surface disposed in finger touch registration with said window opening;
- an insert card interposed between the face plate and the switch, said insert card having a display surface exposed by the window opening, and said insert card being adapted for slidable insertion into and withdrawal from the device cavity through the housing slot; and,
- a plurality of electrical conductors interconnecting the switch to the control module.

16. A wiring device assembly as defined in claim 15, wherein said back plate is intersected by the housing slot.

17. A wiring device assembly as defined in claim 15, including a web separating the face plate from the back plate, said web being intersected by the housing slot.

18. A wiring device assembly as defined in claim 15, wherein the housing slot is formed intermediate the face plate and the back plate.

19. A wiring device assembly as defined in claim 15, including a web separating the face plate from the back plate, said web having a sloping surface for guiding the insert card through said slot.

20. A wiring device assembly as defined in claim 15, wherein said switch is mounted on said back plate.

21. A wiring device assembly as defined in claim 15, wherein said switch is a membrane switch having row conductors and column conductors, said row conductors and column conductors extending transversely with respect to each other and being spaced apart thereby defining a switch at each row and column intersection.

22. A wiring device assembly as defined in claim 15, wherein the switch is a membrane switch having a distributed resistance element, with the row conductors being connected to the resistance element at spaced locations thereon, and including column conductors extending transversely with respect to the row conductors and spaced with respect thereto, thereby defining a pressure responsive switch at each row and column intersection.

23. A switch assembly for use in combination with a wiring device of the type including a yoke strap for attachment to a wall box mounting flange, a control module mounted on the yoke strap, a wiring harness for interconnecting the control module to a switch, and a pair of spaced slots formed through the yoke strap for receiving wiring device retaining screws, said switch assembly comprising, in combination:
- a display housing including a face plate and a back plate, said face plate and back plate being assembled together thereby defining a device cavity, and said housing being intersected by an elongated slot which opens into the device cavity;
- a switch disposed within the device cavity, said switch having a switch surface coincident with said window opening;
- an insert card interposed between the face plate and the switch, said insert card having a display surface exposed by the window opening, and said insert card being adapted for slidable insertion into and withdrawal from the device cavity through the housing slot;
- a coupling plate having a central opening providing through clearance for the control module, wiring harness and wiring device strap retainer screws, said coupling plate having a plurality of press-fit connectors projecting from one side of said coupling plate;
- said back plate having a plurality of complementary press-fit connectors projecting from one side of said back plate, the complementary press-fit connectors of said back plate being adapted for interlocking, press-fit engagement with the press-fit connectors of said coupling plate; and,
- whereby the wiring device is mountable on a wall box by wiring device retaining screws extending through the slots formed through the yoke strap and through the clearance passage provided by said coupling plate into threaded engagement with mounting holes formed in the wall box mounting flange, with said coupling plate being confined between the yoke strap and the mounting box, and the switch assembly being releasably attached to the coupling plate by interlocking engagement of said press-fit connectors.

24. A switch assembly as defined in claim 23, wherein said press-fit connectors are mounted onto the coupling plate at laterally spaced locations relative to the longitudinal axis of the coupling plate, and wherein the complementary press-fit connectors are mounted onto the back plate at laterally spaced locations relative to the longitudinal axis of the back plate, said connectors being aligned with respect to each other for press-fit interlocking engagement when the back plate is pressed against the coupling plate.

25. A switch assembly as defined in claim 23, wherein said back plate is intersected by the housing slot.

26. A switch assembly as defined in claim 23, including a web separating the face plate from the back plate, said web being intersected by the housing slot.

27. A switch assembly as defined in claim 23, wherein the housing slot is formed intermediate the face plate and the back plate.

28. A switch assembly as defined in claim 23, including a web separating the face plate from the back plate, said web having a sloping surface for guiding the insert card through said slot.

29. A switch assembly as defined in claim 23, wherein said switch is mounted on said back plate.

30. A switch assembly as defined in claim 23, wherein said switch is a membrane switch having row conductors and column conductors, said row conductors and column conductors extending transversely with respect to each other and being spaced apart thereby defining a switch at each row and column intersection.

31. A switch assembly as defined in claim 23, wherein the switch is a membrane switch having a distributed resistance element, with the row conductors being connected to the resistance element at spaced locations thereon, and including column conductors extending transversely with respect to the row conductors and spaced with respect thereto, thereby defining a switch at each row and column intersection.

32. Apparatus for attachment to a wall box mounting flange comprising, in combination:
 a wiring device including a yoke strap for attachment to the wall box mounting flange and a control module mounted on the yoke strap, said yoke strap having mounting flange portions which are intersected by spaced slots for receiving wiring device retainer screw fasteners;
 a display housing including a face plate and a back plate, said face plate and back plate being assembled together thereby defining a device cavity, and said display housing being intersected by an elongated slot which opens into the device cavity;
 a switch disposed within the device cavity, said switch having a switch surface coincident with said window opening;
 a plurality of electrical conductors interconnecting the switch to the control module;
 an insert card interposed between the face plate and the switch, said insert card having a display surface exposed by the window opening, and said insert card being adapted for slidable insertion into and withdrawal from the device cavity through the housing slot;
 a coupling plate having a central opening providing through clearance for wiring device strap retainer screws and electrical conductors, said coupling plate having a plurality of press-fit connectors projecting from one side of said coupling plate;
 said back plate having a plurality of complementary press-fit connectors projecting from one side of said back plate, the complementary press-fit connectors of said back plate being adapted for interlocking, press-fit engagement with the press-fit connectors of said coupling plate; and,
 whereby the wiring device is mountable on a wall box by wiring device retaining screws extending through the slots formed through the yoke straps and through the clearance passage provided by said coupling plate into threaded engagement with mounting holes formed in the wall box mounting flange, with said coupling plate being confined between the yoke strap and the mounting box, and the switch assembly being releasably attached to the coupling plate by interlocking engagement of said press-fit connectors.

* * * * *